United States Patent [19]

Trevisan

[11] Patent Number: 4,905,574

[45] Date of Patent: Mar. 6, 1990

[54] SINGLE-ACTING ROTARY PNEUMATIC ACTUATOR, INCLUDING AT LEAST A PRECOMPRESSED SPRING ASSEMBLY

[76] Inventor: Giovanni Trevisan, Via Edison, 233 -- 20019 Settimo Milanese (Milano), Italy

[21] Appl. No.: 284,990

[22] Filed: Dec. 15, 1988

Related U.S. Application Data

[63] Continuation-in-part of Ser. No. 921,732, Oct. 21, 1986, abandoned.

[30] Foreign Application Priority Data

Jul. 8, 1986 [IT] Italy ............................ 21068 A/86

[51] Int. Cl.$^4$ .............................................. F01B 7/02
[52] U.S. Cl. ...................................... 92/69 R; 16/79; 92/130 R; 92/130 D; 185/37; 267/170; 267/174; 267/169
[58] Field of Search ................... 267/71, 72, 116, 170, 267/174, 177, 179, 286, 287, 291, 169, 4; 185/37, 45; 16/79, 80; 92/68, 69 R, 130 R, 130 D, 136

[56] References Cited

U.S. PATENT DOCUMENTS

| 64,087 | 4/1867 | Evans | 287/4 |
|---|---|---|---|
| 287,638 | 10/1883 | Davis | 267/4 |
| 1,146,933 | 7/1915 | Gallagher Jr. | 267/4 X |
| 1,943,492 | 1/1934 | Symington | 267/4 |
| 1,989,433 | 1/1935 | Symington | 267/4 |
| 3,059,268 | 10/1962 | McHale | 288/285 X |
| 4,118,020 | 10/1978 | Myers | 267/177 X |
| 4,282,979 | 8/1981 | Friedricks | 267/177 X |
| 4,436,112 | 3/1984 | Atkins et al. | 267/177 X |
| 4,615,507 | 10/1986 | Rousset et al. | 267/170 X |
| 4,665,583 | 5/1987 | Frolav et al. | 16/79 |

FOREIGN PATENT DOCUMENTS 1169209 4/1964 Fed. Rep. of Germany ...... 267/179

Primary Examiner—Geroge E. A. Halvosa
Attorney, Agent, or Firm—Bucknam and Archer

[57] ABSTRACT

The rotary actuator includes at least a precompressed spring assembly comprising a compression coil spring the ends of which are engaged by flanged cups adapted to limit the spring extension and carried slidably on a pin provided, at each end, with a circlip which prevents the cups from coming off the pin itself.

1 Claim, 3 Drawing Sheets

SINGLE-ACTING ROTARY PNEUMATIC ACTUATOR, INCLUDING AT LEAST A PRECOMPRESSED SPRING ASSEMBLY

This is a continuation in part of the U.S. Pat. application Ser. No 921,732 filed on Oct. 21, 1986, now abandoned in the name of the same Applicant.

BACKGROUND OF THE INVENTION

As is known, single acting rotary pneumatic actuators are used for the actuation of ball valves, butterfly valves and in general wherever there is the need for generating a rotary movement of less than a full revolution, the return movement of the actuator being obtained by means of return springs which act on the piston of the actuator which causes the forward movement thereof under the action of a fluid under pressure.

One known type of rotary actuator has a linearly reciprocable piston having a toothed rack meshing with a pinion on an actuator shaft which is thus caused to turn through a partial revolution upon linear movement of the piston. Return movement of the piston is achieved by means of a compression spring fitted in the actuator body between the piston and a removable cap of the actuator. In the extended position such a spring has a significant natural length in order to be able to exercise, during the return stroke of the piston, the required force to exert the necessary torsional couple on the actuator shaft, and even when at the end of working stroke, the spring is still held under a certain compression. In some actuators there may be several such springs acting on one or more pistons.

The natural length of the or each spring, when at the end of its working stroke, is always greater than the length of the housing within which it is mounted within the the actuator, so that there is always a preload on the springs. Obviously, the larger the torsional couple to be exerted by the actuator the greater the pre-load it is necessary to give to the spring, and the greater must be its natural length with respect to the length of the housing.

Taking account of the fact that the preload of the springs used in actuators can reach values of several thousands of Kg., it will be immediately seen that their assembly and dismantling requires special equipment and significant safety precautions. In particular, if it is necessary to effect maintenance of a single-acting rotary actuator, or to change the number of return springs to obtain a different torsional couple when remote from the factory or service workshop, one is confronted with a rather complicated job and one which in many cases is dangerous. In fact, usually, at the location of the installation in which the actuator is fitted there is no suitable equipment or specialized personnel for this task, and any attempt to dismantle the actuator merely by removing the screws which connect the head to the body of the actuator can involve significant risks in that the head could be violently thrust by the preload of the spring or springs.

Because of this the maintenance and dismantling of actuators are for safety reasons generally carried out in factories, which means that the actuator has to be sent back to the factory every time for the normal maintenance work, with consequent stopping of the installation on which it is fitted.

SUMMARY OF THE INVENTION

A primary object of the present invention is that of overcoming the above mentioned drawbacks by providing an improved pneumatic rotary actuator including at least a precompressed spring unit assembly which gives the possibility of having a desired value of the pre-load on the spring or springs, even with the actuator piston at the end of its return stroke, without, however, being faced with a dangerous situation if it must be dismantled for maintenance.

Another object is to provide such an improved actuator in which the pre-load can be automatically set at a precise desired value without the need of carrying out complicate adjusting operations, and in which the pre-load can be precisely held at the set value for the overall operative life of the actuator.

A further object of the invention is to provide such an actuator on which all those operations connected with the maintenance and dismantling of the actuator can be performed at the point of installation.

Yet another object of the present invention is to provide such an actuator in which the at least one pre-compressed spring assembly can be installed easily as an independent unit without requiring dangerous operations.

Yet another object of the invention is to provide such an actuator in which the turns of the spring of said precompressed spring assembly are prevented from deflecting both at the center and at the ends of the spring.

According to the invention, the above objects are achieved by an improved rotary pneumatic actuator according to the claim.

BRIEF DESCRIPTION OF THE DRAWINGS

Further characteristics and advantages of the invention will become more apparent from the following detailed description of a preferred embodiment thereof, which is illustrated, by way of an indicative example, in the figure of the accompanying drawings, where.

DESCRIPTION OF THE PREFERRED EMBODIMENT

Figure 5:
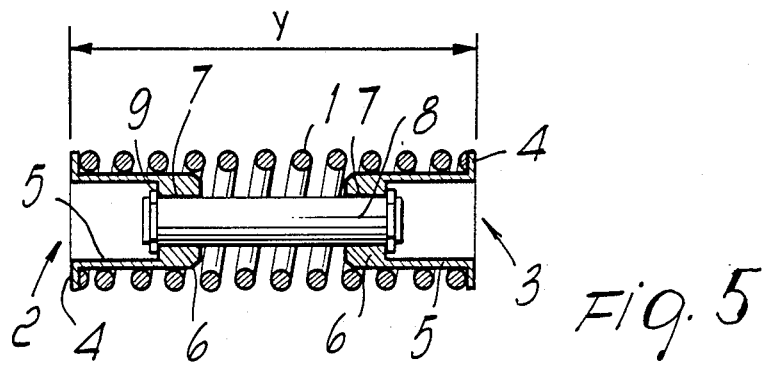
FIG. 5 is an axial section showing the spring of FIG. 4 to which have been fitted means for limiting its elongation, in the position of mawimum elongation.

Referring now to the drawings, the improved actuator according to the invention comprises at least a precompressed spring unit assembly (in the shown embodiment four assemblies), each of which comprises a coil spring generally indicated with the reference numeral 1, which in its relaxed state has a natural length x which is a direct function of the resilient thrust which it is desired to make the spring assume in the compressed position. In FIG. 5 the spring 1 is shown pre-compressed by means serving to limit the elongation of the spring 1 to a value y less than its natural length but greater than the maximum elongation intended in use, in such a way that the spring always maintains a pre-load set value.

In the preferred embodiment being illustrated, which, however is not intended to be limiting, said limiting means are constituted by a first and second end cup, respectively indicated with the reference numerals 2 and 3, each of which has a radially outward peripheral flange around the lip and are fitted into the corresponding end of the spring which engages against the flange. The bottom wall of each spring cup 2,3 is identified with the reference numeral 6 and has a thickness much greater than that of each flange in order to prevent the end turns of the spring from deflecting under load. Said bottom wall is provided with a through hole 7 in which is slidable a pin 8 provided, at each end, with a circlip 9 which prevents the spring cups 2,3 from coming off the pin itself.

The depth of each spring cup 2,3 is such that, even when the spring 1 is fully compressed, the ends of the pin 8 do not project out from the cups 2,3. On the other hand, when released, the spring 1 as indicated in FIG. 5 is always held by the end cups 2,3 engaged against the circlips 9 to form a spring of length close to, but slightly greater than the maximum length which the spring will be held to in use.

Figure 6:
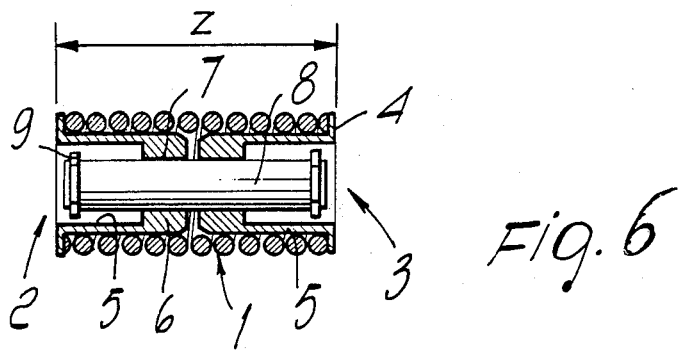
FIG. 6 is an axial section schematically illustrating the precompressed spring in the completely compressed condition, corresponding to the minimum length which the spring can assume.

As shown in FIG. 6, each of the end cups 2 and 3 has, in an axial direction, a length slightly less than half the length of the spring when fully compressed, as is schematically illustrated in FIG. 6. Likewise, the pin 8 has an axial length which is less than the minimum length z which the spring 1 can assume when compressed.

Figure 2:
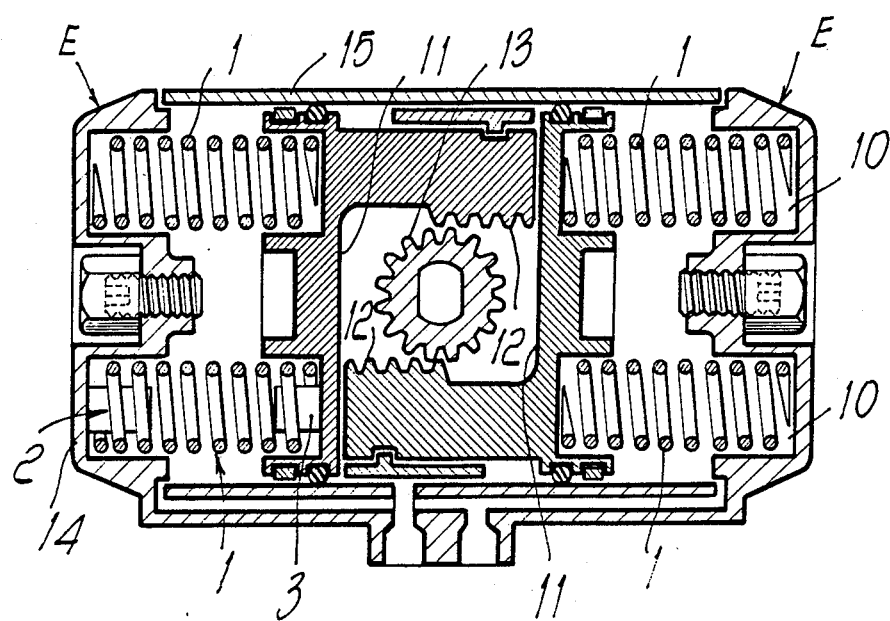
FIGS. 1 and 2 are schematic sectional views through a single-acting pneumatic rotary actuator according to the invention including four precompressed spring assemblies, the actuator being respectively shown in the actuated condition with the springs completely compressed and in the released condition with the springs extended.
Figure 1:
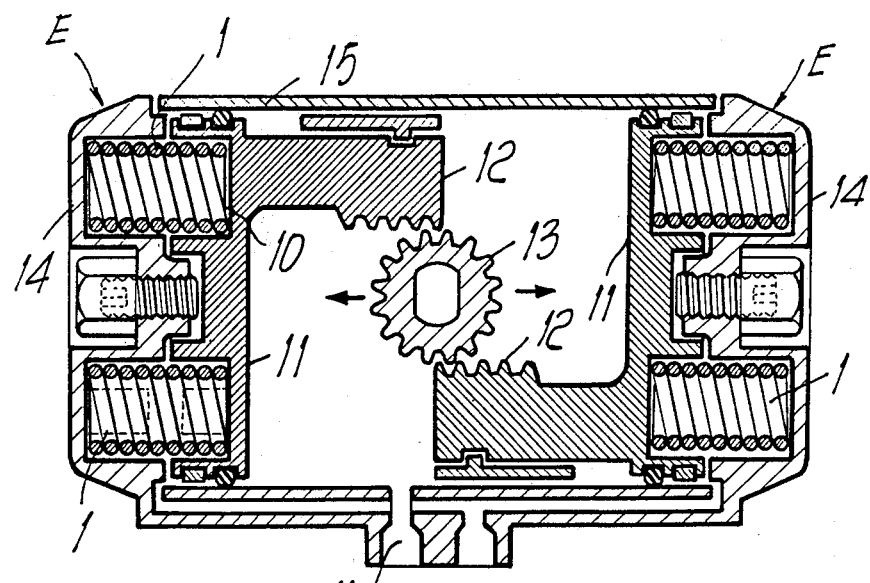
Figure 3:
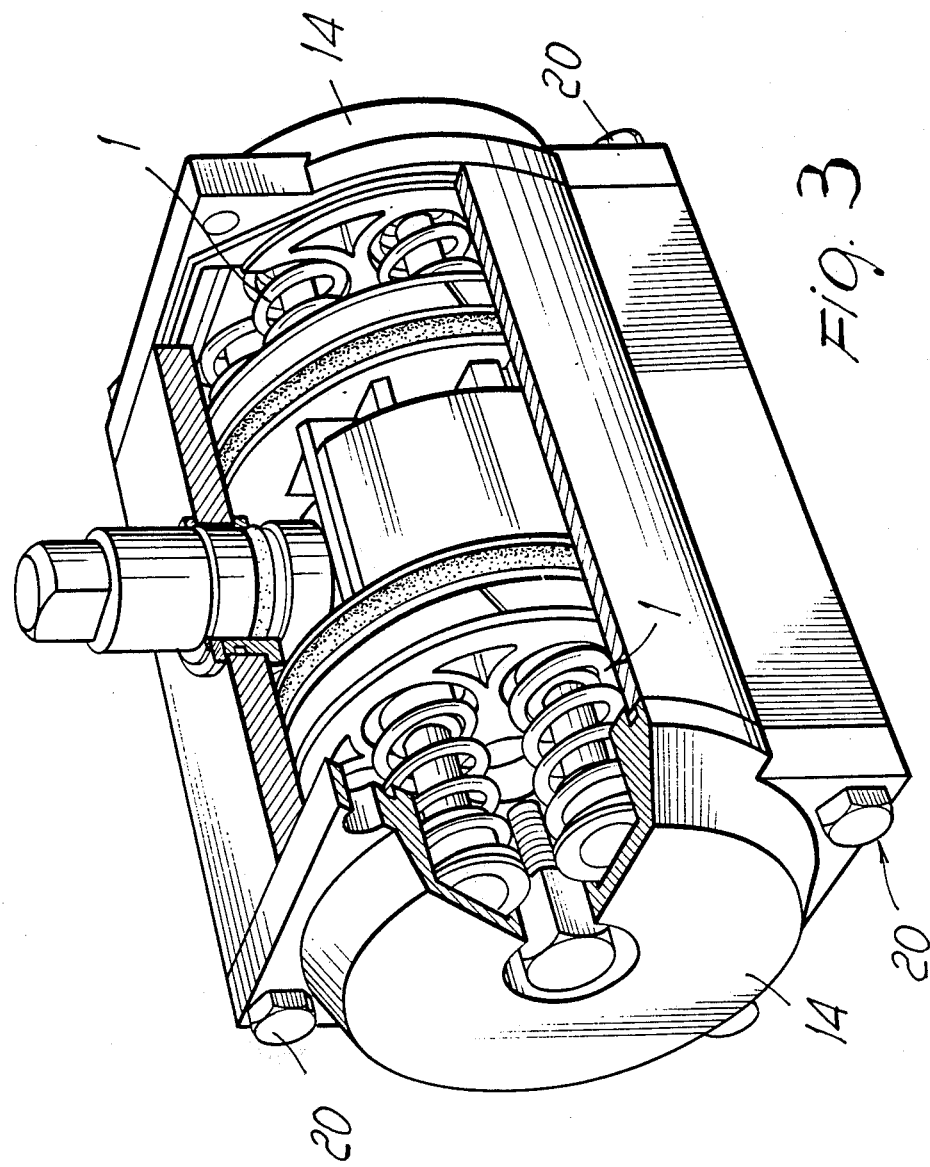
FIG. 3 is a schematic perspective view, partially broken away, of the subject actuator.
Figure 4:
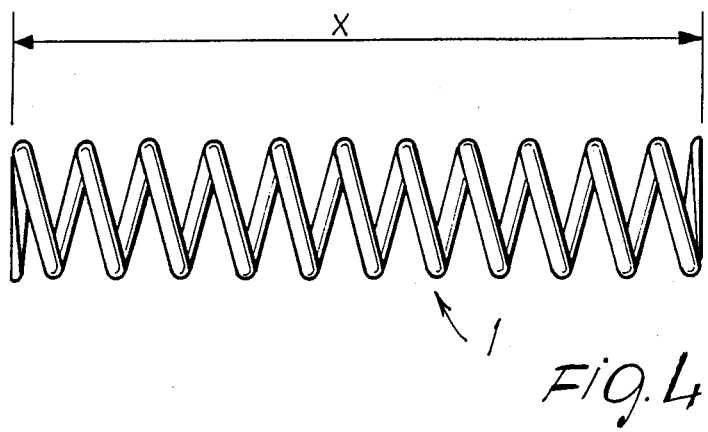
FIG. 4 is a schematic side view of a coil spring in its extended position.

Referring now to FIGS. 1 to 3, there are shown four precompressed springs 1 housed in a respective chamber 10 between the crowns of respective pistons 11, each of which has a toothed rack portion 12 meshing with a central pinon 13, and the end cup 14 of the body 15 of the actuator. As illustrated in FIG. 1, during the forward stroke of the actuator, effected by introducing a pneumatic fluid through an inlet 16, the pistons 11 slide towards the ends of the actuator, compressing the springs. In the return stroke, the energy stored in the springs causes the return stroke, with the desired torsional couple which is a function of the spring pre-load. If it becomes necessary to dismantle the actuator, there are no particular risks in that the above-described limiting means maintain the maximum length y which the spring can assume at a value no greater than about one or two millimeters more than the maximum length in use, at the same time assuring the set pre-load.

Thus, upon removing the end cups 14 by unscrewing bolts 20 (see FIG. 3) it will be seen that after having unscrewed for a short section, the springs no longer extend, being held by the limiting means and thus do not constitute dangerous elements in the dismantling stage.

Moreoever, to what has been said it can be added that the limiting means housed axially within the spring body for about two thirds of its length, ensure that this does not deflect from its axis during compression, thus contributing to an improvement in the operation of the spring itself.

From the above disclosure it should be apparent that the invention fully achieves the intended objects.

In particular there has been disclosed a rotary actuator including precompressed spring assemblies each component of which has been specifically designed and studied for heavy applications and in which the actuator precompressed spring assemblies can be each quickly installed and removed, as a unit, without risks.

These features are deemed to be actually new in the actuator art, and, for example, they are new and not obvious over the U.S. Pat. No. 1,943,492 to Sylmington, which discloses a precompressed coil structure which, even if it is structurally similar to that of the invention, could not be used in a rotary actuator and could not be installed or removed as a unit, since its spring is anchored to a bottom cover.

I claim:

1. An improved single-acting pneumatic rotary actuator including at least a chamber defined between crown portions of piston members, each of which has a toothed rack portion meshing with a central pignon, and an end cup of a body member of said actuator, a pre-compressed spring assembly in said at least a chamber, said pre-compressed spring assembly comprising, in combination:

a compression coil spring, length limiting cups on said compression coil spring so designed and arranged as to limit the extension length of said spring to a value less than its natural length and slightly greater than an intended maximum use extension, said cups being fitted within the interior of said spring at each end of said spring;

a central pin extending coaxially of said spring, said cups being slidable along said central pin and having each a radially outward end flange, each said flange being engageable with each adjacent end of said spring, each said cup having a cylindrical body closed at one end remote from said flange by an end wall, and a hole in each said end wall through which said pin is slidably engaged, said cups being retained on said pin by circlips engaged in annular grooves at end portions of said pin, each of said cups having an axial length slightly less than one half of the axial length of said spring when fully compressed, said end walls of said cups having a thickness much greater than the thickness of said flange, said pin having an axial length slightly less than the axial length of said spring when fully compressed, a sum of the lengths of said cups corresponding to about two thirds of the length of said spring when said spring is not fully compressed, said spring assembly being so designed that a maximum length which said spring can assume has a value no greater than about 1–2 mm more than a maximum use length, said precompressed spring assembly forming a unit assembly adapted to be fitted in said chamber and removed therefrom without dismantling said spring.

* * * * *